United States Patent
Radatti et al.

(10) Patent No.: US 7,404,212 B2
(45) Date of Patent: *Jul. 22, 2008

(54) APPARATUS AND METHODS FOR INTERCEPTING, EXAMINING AND CONTROLLING CODE, DATA AND FILES AND THEIR TRANSFER

(75) Inventors: Peter V. Radatti, Conshohocken, PA (US); Timothy R. Eliseo, Fair Oaks, CA (US)

(73) Assignee: CyberSoft, Inc., Conshohocken, PA (US)

( * ) Notice: Subject to any disclaimer, the term of this patent is extended or adjusted under 35 U.S.C. 154(b) by 300 days.

This patent is subject to a terminal disclaimer.

(21) Appl. No.: 09/800,328

(22) Filed: Mar. 6, 2001

(65) Prior Publication Data

US 2002/0129237 A1 Sep. 12, 2002

(51) Int. Cl.
- *G06F 21/00* (2006.01)
- *G06F 15/16* (2006.01)
- *G06F 11/30* (2006.01)

(52) U.S. Cl. .......... 726/24; 713/188; 713/189; 709/224

(58) Field of Classification Search ........... 713/200, 713/201, 151, 152, 154, 188; 709/223–225, 709/227–232

See application file for complete search history.

(56) References Cited

U.S. PATENT DOCUMENTS

| | | | |
|---|---|---|---|
| 5,070,528 A * | 12/1991 | Hawe et al. ......... | 713/161 |
| 5,126,728 A | 6/1992 | Hall | |
| 5,278,901 A | 1/1994 | Shieh et al. | |
| 5,319,776 A | 6/1994 | Hile et al. | |
| 5,414,833 A | 5/1995 | Hershey et al. | |
| 5,481,735 A | 1/1996 | Mortensen et al. | |
| 5,511,163 A | 4/1996 | Lerche et al. | |
| 5,550,984 A | 8/1996 | Gelb | |
| 5,586,266 A | 12/1996 | Hershey et al. | |
| 5,623,600 A | 4/1997 | Ji et al. | |
| 5,682,428 A | 10/1997 | Johnson | |
| 5,761,424 A | 6/1998 | Adams et al. | |
| 5,802,178 A | 9/1998 | Holden et al. | |
| 5,832,208 A | 11/1998 | Chen et al. | |
| 5,832,228 A | 11/1998 | Holden et al. | |
| 5,889,943 A | 3/1999 | Ji et al. | |
| 5,916,305 A | 6/1999 | Sikdar et al. | |
| 5,931,917 A | 8/1999 | Nguyen et al. | |

(Continued)

OTHER PUBLICATIONS

Microsoft Computer Dictionary third edition, 1997, p. 355.*

(Continued)

*Primary Examiner*—Christopher A Revak
(74) *Attorney, Agent, or Firm*—John F. A. Earley, III; Frank J. Bonini, Jr.; Harding, Early, Follmer & Frailey, P.C.

(57) ABSTRACT

The present invention comprises apparatus and methods for processing code, that is, for intercepting, examining and/or controlling code streams in a network. "Man in the middle" technology by use of decryptor/encryptor components are placed between client and server which permit alteration of the code as it passes through a communications channel. The code may then be examined by way of a proscribed code scanner. A protocol parser may also be implemented in order to intercept the code as it passes through the stack and transfer the code to the decryptor/encryptor components.

16 Claims, 4 Drawing Sheets

U.S. PATENT DOCUMENTS

| | | | |
|---|---|---|---|
| 5,983,348 A * | 11/1999 | Ji | 713/200 |
| 5,987,610 A * | 11/1999 | Franczek et al. | 713/200 |
| 6,009,525 A | 12/1999 | Horstmann | |
| 6,067,410 A * | 5/2000 | Nachenberg | 703/28 |
| 6,088,803 A | 7/2000 | Tso et al. | |
| 6,178,505 B1 | 1/2001 | Schneider et al. | |
| 6,334,189 B1 * | 12/2001 | Granger et al. | 713/200 |
| 6,356,951 B1 | 3/2002 | Gentry, Jr. | |
| 6,357,008 B1 * | 3/2002 | Nachenberg | 713/200 |
| 6,389,534 B1 | 5/2002 | Elgamal et al. | |
| 6,393,568 B1 * | 5/2002 | Ranger et al. | 713/188 |
| 6,421,733 B1 | 7/2002 | Tso et al. | |
| 6,549,937 B1 | 4/2003 | Auerbach et al. | |
| 6,577,920 B1 | 6/2003 | Hypponen et al. | |
| 6,697,950 B1 | 2/2004 | Ko | |
| 6,721,424 B1 * | 4/2004 | Radatti | 380/286 |
| 6,851,057 B1 | 2/2005 | Nachenberg | |
| 2002/0004819 A1 | 1/2002 | Agassy et al. | |
| 2002/0007453 A1 | 1/2002 | Nemovicher | |
| 2002/0073323 A1 | 6/2002 | Myles | |
| 2003/0131061 A1 | 7/2003 | Newton et al. | |

OTHER PUBLICATIONS

PixelFusion Processor Now Hunting Network Apps, May 17, 200, p. 1-2.*

Redmond, T., "The Great Anti Virus Crusade", *Windows 2000 Magazine* (Apr. 2001) pp. 1-4.

Afzal, Motoraola PowerPC Migration Tools—Emulation and Translation, 1996, IEEE, p. 145.

* cited by examiner

APPARATUS AND METHODS FOR INTERCEPTING, EXAMINING AND CONTROLLING CODE, DATA AND FILES AND THEIR TRANSFER

CROSS-REFERENCE TO RELATED APPLICATIONS

This application is a continuation-in-part of U.S. Ser. No. 09/244,154, entitled "NETWORK TRAFFIC INTERCEPTING METHOD AND SYSTEM," filed on Feb. 3, 1999, and issued as U.S. Pat. No. 6,763,467, on Jul. 13, 2004, by Peter V. Radatti and David J. Harding, which disclosure is incorporated herein by reference;

and is related to co-pending application Ser. No. 09/800314, entitled "APPARATUS AND METHODS FOR INTERCEPTING, EXAMINING AND CONTROLLING CODE, DATA AND FILES AND THEIR TRANSFER," filed on same date herewith, by Peter V. Radatti and Timothy R. Eliseo, which disclosure is incorporated herein by reference.

FIELD OF THE INVENTION

The present invention relates to apparatus and methods for intercepting, examining and controlling code, data and files and their transfer. More particularly, the present invention relates to apparatus and methods for intercepting, examining and controlling code, data and files and their transfer through secure connections.

BACKGROUND OF THE INVENTION

The rise of the Internet and networking technologies has resulted in the widespread transfer of code, data and files between computers. Transfer through the Internet and networking may be secured in a number of ways. Secure Sockets Layer (SSL) and Secure Multi-Purpose Internet Mail Extension (S/MIME) are two of the primary methods used to secure transfers. Both SSL and S/MIME use encryption to secure transfers. The transferred code, data and/or files ("code") are encrypted by the sender and decrypted by the receiver.

Secure transfers are, of course, rendered secure in order to make the code impenetrable to other applications and third parties. For example, encrypted code cannot be reviewed by a virus scanning application. The virus scanner cannot interpret the code and so cannot review the code for the presence of viruses. Accordingly, it would be desirable to provide an ability to review encrypted code.

Accordingly, it is an object of the present invention to provide apparatus and methods for intercepting, examining and controlling code and its transfer through secure connections in an efficient and effective manner transparently or almost transparently to the end-user, with little or no operational effort required by the user.

It is yet another object of the present invention to provide apparatus and methods that simply and effectively intercept, control, and/or examine incoming and outgoing secure code in an efficient and effective manner transparently or almost transparently to the end-user, with little or no operational effort required by the user.

SUMMARY OF THE INVENTION

The present invention comprises apparatus and methods for intercepting, examining, and controlling code transferred through a connection. The present invention may operate on a single computer system or multiple systems depending on the operating system and other variables. The present invention may, in various embodiments, process, that is, intercept, examine, and/or control any or all code streams in a computer or network. Intercepting, examining and/or controlling code includes but is not limited to monitoring, blocking, logging, quarantining, discarding or transferring code. Although the present invention can be implemented on various platforms, the preferred embodiments are used in Unix® and various Windows® environments, such as NT, 2000, 95, 98 and Me.

The preferred embodiments monitor transfers from a system using a protocol parser which may be placed on the client system, the server system, or other intermediate system or component. In the especially preferred Unix® embodiments, the protocol parser is a Unix® STREAMS module and driver activated when an application opens a STREAMS device of the proper type. In the especially preferred Windows® NT embodiments, the protocol parser is a WinNT driver activated when an application opens a communications channel. When the parser intercepts a request from a client or server for an SSL transfer the parser creates a new SSL server that communicates with the original client and a new SSL client that communicates with the original server. The SSL server and SSL client may then intercept any and all communications that occur between the original SSL client and original SSL server.

The especially preferred embodiments insert a proscribed code scanner between the protocol server and protocol client. This proscribed code scanner may be an antivirus scanner, pattern scanner, and/or content scanner or other types and provides the ability to review the content of the SSL encrypted communications.

The preferred embodiments will also intercept and review S/MIME messages. The S/MIME messages will be intercepted by the protocol parser and sent to a S/MIME decryptor. The decrypted messages can then be scanned by a proscribed code scanner, which may be an antivirus scanner, pattern scanner, and/or content scanner or other types. The proscribed code scanner will then review the code and signal whether the S/MIME message may be released from interception.

DETAILED DESCRIPTION OF THE PREFERRED EMBODIMENTS

The preferred embodiments processes altered code. Altered code is defined herein as code altered by encryption or a communication protocol after being generated by an application or program for transmission to a complementary encryption or communication protocol. For example, both SSL and S/MIME alter code by securing code through encrypting and decrypting code on both the server and client ends of the communication. SSL is a protocol layer encryption used in TCP connections and implemented between the HTTP layer and the TCP layer. Code is encrypted as it passes through the SSL protocol layer. S/MIME secures code by encrypting mail messages and their attachments through a mail application.

The preferred embodiments process, that is, intercept, examine, and/or control any or all code streams transferred through any number of connections in a computer or network. Intercepting, examining and/or controlling code includes but is not limited to monitoring, blocking, logging, quarantining, discarding or transferring code.

In order to intercept the altered code, the embodiments are used in a "man in the middle" implementation.

Certain preferred embodiments are installed on a STREAMS enabled Sun Solaris Unix® platform. It should be specifically understood that embodiments can be implemented in other Unix® and Unix®—like platforms, including but not limited to Linux® and its variants, as well as other operating system platforms including but not limited to Microsoft Windows® NT, Windows® 2000, Windows® 95, 98 and Me, IBM OS/390, MacOS, VxWorks® and others.

Figure 1:
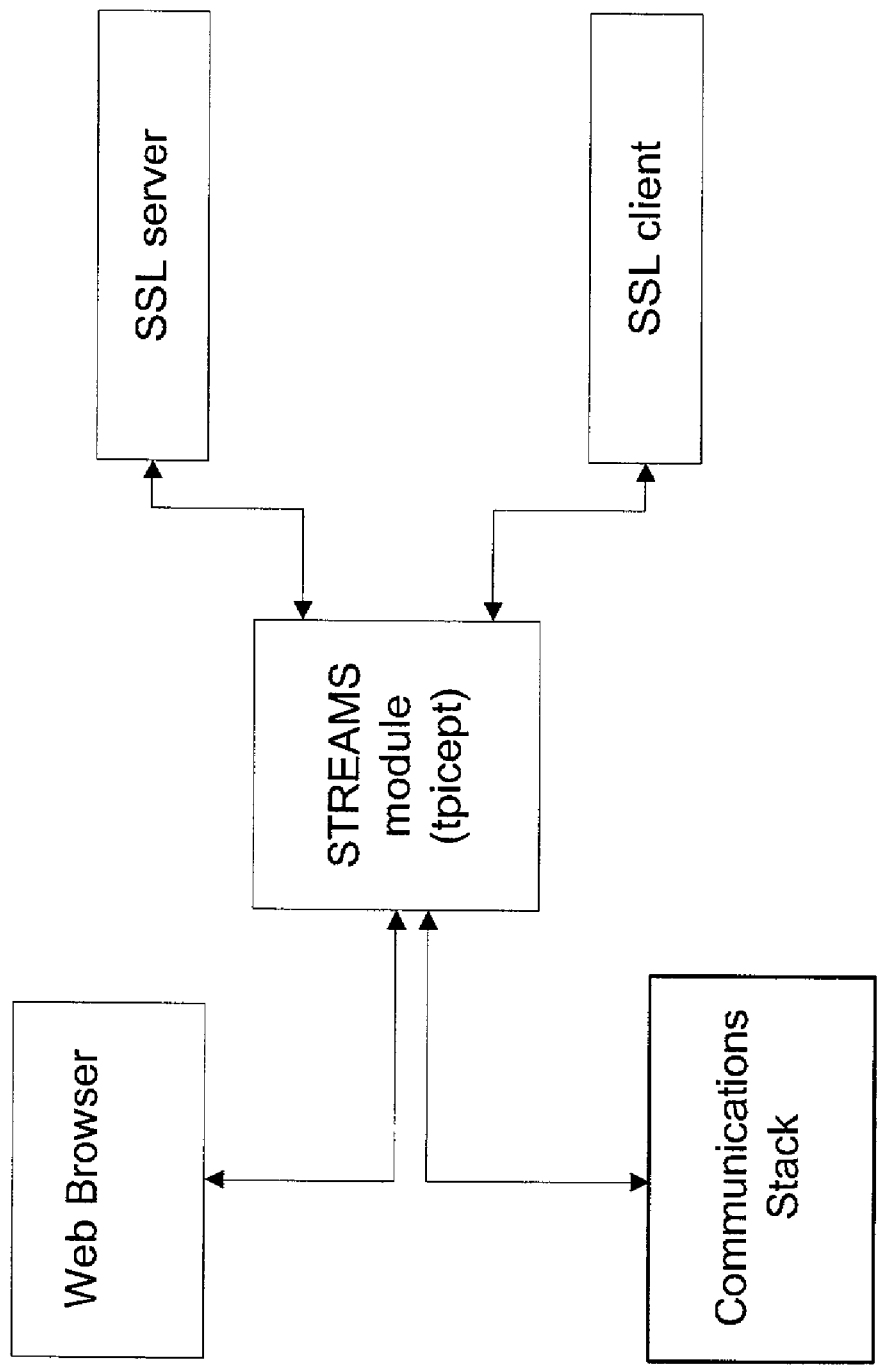
FIG. 1 is a schematic diagram of operation of a preferred embodiment.

In the preferred Unix® embodiments, when a Web browser or other application opens a STREAMS device, a STREAMS module tpicept will be inserted in the stream. As shown in FIG. 1, tpicept intercepts code passing in the stream. (The remainder of the stream or communications stack is not shown here.) If the Web browser opens a secure connection, for example the HTTPS connection shown in the figure, the tpicept module will detect the opening and call a protocol SSL server and protocol SSL client, as is described in more detail below.

Figure 2:
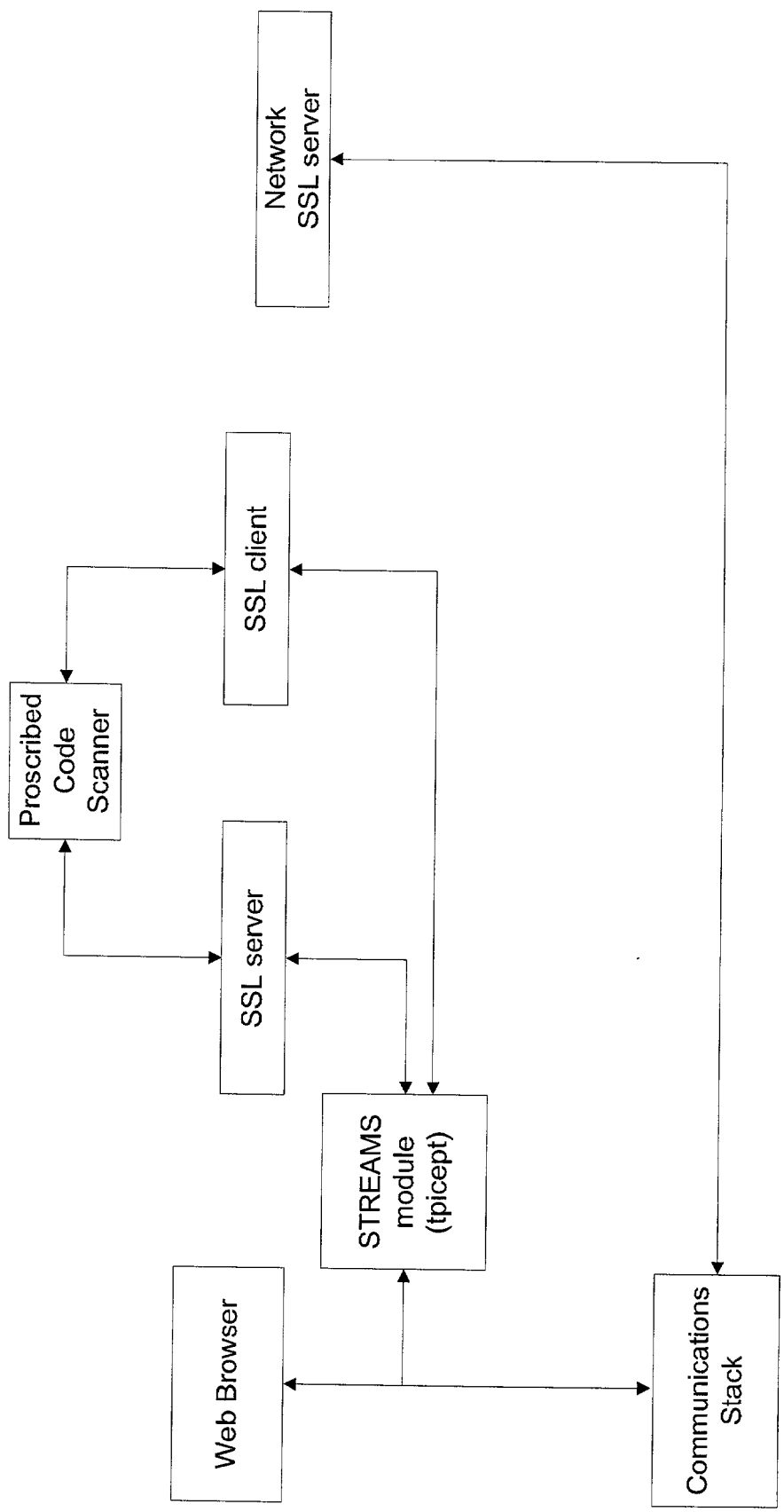
FIG. 2 is a schematic diagram of operation of a preferred embodiment.

Turning to FIG. 2, once the protocol SSL server and protocol SSL client are called, all communications through the stream will pass through those connections. (The remainder of the stream or communications stack is not shown here.) The protocol SSL server will decrypt the communications and, in the especially preferred embodiments, send the communications to a proscribed code scanner. The proscribed code scanner will in turn scan the code.

The proscribed code scanner analyzes the code according to its configuration settings. These settings can take numerous forms, including scanning for specific proscribed code or code segments, calculating hash codes of the code or code segment and then scanning a database of proscribed hash codes, etc. If the code is acceptable, the proscribed code scanner will indicate to the protocol SSL client that the code is acceptable and can pass through the system. The protocol SSL client in turn will re-encrypt the code, and return the code to the communications stack through the tpicept module. In turn, the code is sent to the network SSL server. In this case, the process will have been virtually transparent, that is, the interception process will have minimal impact on the performance of the computer and networking connections.

If the code is not acceptable, the proscribed code scanner will indicate the code is not acceptable. In the especially preferred embodiments, that indication will be sent directly to the user and/or the application. In other embodiments, the indicator may result in access to the code being denied; in extracting the proscribed code from the remainder; in quarantining and saving or transferring the proscribed code for analysis or deleted; the proscribed code could be modified; the proscribed code could be sent to an administrator or security department or firm; etc.

The tpicept STREAMS module begins the interception when tpicept detects a connection to a specific port, such as a port commonly used for HTTPS, or a specific signal such as the STARTTLS command in the SMTP protocol. tpicept opens a channel to a protocol SSL server instance in order to send code to the protocol SSL server. tpicept will also open a protocol SSL client instance. The protocol SSL server and the protocol SSL client will continue with the usual SSL negotiations, including the choice of encryption keys, thus placing themselves in the position of the SSL server that the user client application expects to communicate with and the SSL client that the SSL network expects to communicate with.

Figure 3:
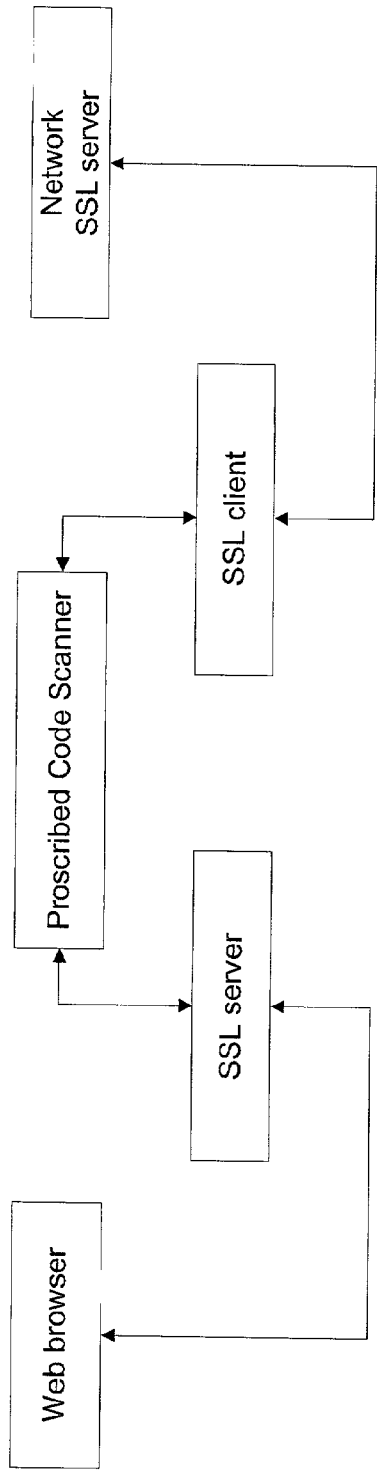
FIG. 3 is a schematic diagram of operation of a preferred embodiment.
Figure 4:
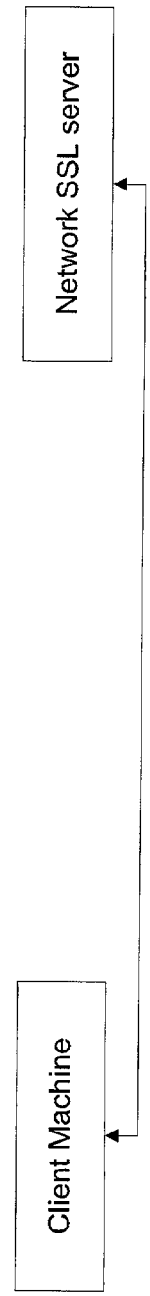
FIG. 4 is a schematic diagram of a prior art embodiment.

In the preferred embodiments, implementing a single SSL connection as shown in FIG. 3, the user client application identifies a single remote site with a single server certificate, such as shown in the prior art schematic diagram of FIG. 4. Thus there are two SSL connections opened on either side of the "man in the middle," as can be seen in the schematic diagram of FIG. 3, rather than one, as would be the case without the "man in the middle" interception, as can be seen in the prior art schematic diagram of FIG. 4.

The user's certificate database—necessary for a SSL connection—usually is managed through the user client application. In some embodiments, this database cannot be modified directly. (However, it may be possible in other embodiments to modify this database directly.) In some embodiments, automatic verification of site specific certificates may occur, however, certificates from certificate authorities may not be accepted. If a certificate from an untrusted site is received, an notification component of the embodiment may notify the user and/or administrator of the untrusted certificate and requesting confirmation. If the user and/or administrator indicates that the certificate should be stored, then the notification component will store the certificate in its own global certificate database. Alternatively, the user or administrator could then import this certificate into the Web browser or other application database. If a certificate authority provides an unknown certificate, the certificate could be added to the Web browser or other application database through manners known in the art.

Figure 5:
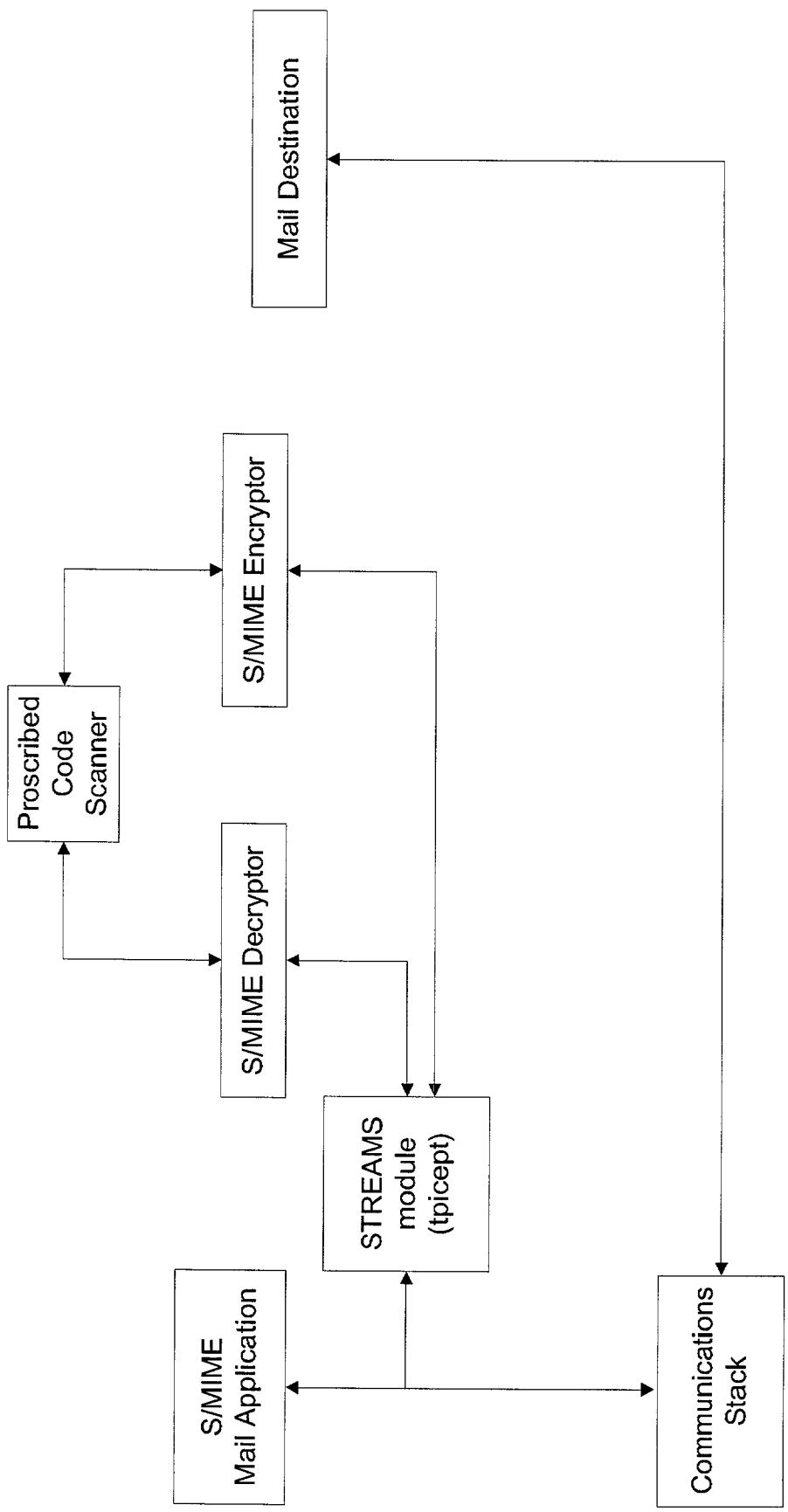
FIG. 5 is a schematic diagram of operation of a preferred embodiment.

FIG. 5 shows the preferred embodiment in the course of intercepting S/MIME mail. An S/MIME mail application has been opened and the tpicept STREAMS module intercepts all mail messages sent to and from the application by inserting itself on the communications stack as described above with regard to SSL interception. The tpicept module has called an S/MIME encryptor component and an S/MIME decryptor component, which in some embodiments are installed along with SSL server/client components similar to those described above. S/MIME messages are then sent to the S/MIME decryptor component by the intercept module which decrypts the mail in order to then send the mail message to a queue, where the messages await scanning by a proscribed code scanner.

The proscribed code scanner will indicate that the messages are either acceptable, that is, not contain proscribed code, or unacceptable, that is contain proscribed code. If the indication is that the messages are acceptable, the queue releases the message to the S/MIME encryptor which re-encrypts the message and return it to the intercept module for reinsertion into the stack. If the indication is that the message is unacceptable, any of a number of actions may be taken including notifications of the user, administrator, sender, receiver, as well as blocking or the message, copying of the message to a storage area, logging of the message, etc.

The proscribed code scanner analyzes the code according to its configuration settings. These settings can take numerous forms, including scanning for specific proscribed code or code segments, calculating hash codes of the code or code segment and then scanning a database of proscribed hash codes, etc. The process will have been virtually transparent, that is, the interception process will have minimal impact on the performance of the computer and networking connections.

In order for the S/MIME decryptor component to decrypt the mail, the private key of the sender or recipient of the mail must be located and used. If the key is not found, the mail is stored or quarantined in this embodiment and the user or administrator will be notified to supply the key or its location. When the embodiment stores or quarantines received mail in this embodiment, the sender or originator will have no direct indication that this has occurred. Therefore, the storage or quarantine area is preferably checked manually. Other embodiments may notify the user, through methods known in the art, that intercepted mail is waiting in the received storage area.

Other preferred embodiments are written for the Windows® NT platform. In the especially preferred NT embodiment, installation of this embodiment begins with installing csiservice.exe in an appropriate directory or directories, e.g., WinNT\System32, as well as csitcpip.sys, an NT driver, in an appropriate directory or directories (usually, WinNT\System32\drivers). csiservice.exe provides the driver to the system when called. The protocol scanner and the proscribed code scanner are also installed at this time in appropriate directories, e.g., WinNT\System32.

After rebooting, csiservice.exe calls the driver, which in turn, will call the protocol scanner when a Web browser or other application opens a secure connection, for example a HTTPS connection. The interception settings and processes, which may be set in any of a number of ways, are as described above with regard to the UNIX® preferred embodiments.

The preferred embodiments may be used on a single machine, with a connection to another machine or system, network or the Internet. Preferred embodiments may also be used on a separate machine or system inserted in a communications channel, including but not limited to another computer, proxy server, firewall, router and the like. Moreover, using the man in the middle technology of the present invention means that any of a number of interception embodiments may be constructed in accordance with the present invention, including interception of encryption and other communication protocols known and unknown in the art. Certain embodiments may as well combine interception processes, e.g. combining both SSL and S/MIME interception processes in one embodiment, or other combinations of encryption or other communication protocols.

It should also be noted that the man in the middle technology of the present invention is not limited to use of a protocol parser, such as a Unix® intercept module, WinNT driver or other interception means. For example, embodiments implemented on a local mail system replace the local delivery agent (typically /bin/mail in a Unix® platform) with S/MIME decryptor/encryptor components which in turn will have the code scanned by a proscribed code scanner as described above.

Other embodiments can be ported to other Unix® and Unix®—like platforms, including but not limited to Linux® and its variants, as well as other operating system platforms including but not limited to Microsoft Windows® NT, Windows® 2000, Windows® 95, 98 and Me, IBM OS/390, MacOS, VxWorks® and others.

The above description and the views and material depicted by the figures are for purposes of illustration only and are not intended to be, and should not be construed as, limitations on the invention.

Moreover, certain modifications or alternatives may suggest themselves to those skilled in the art upon reading of this specification, all of which are intended to be within the spirit and scope of the present invention as defined in the attached claims.

We claim:

1. An apparatus for processing secure code transmitted through a communications channel comprising: a protocol parser; a decryption component; and, a proscribed code scanner; wherein said protocol parser intercepts secure code being transmitted through said communications channel and transfers said code to said decryption component for decryption and scanning by said proscribed code scanner, said proscribed code scanner analyzing code for parameters of the code passing through the communications channel.

2. An apparatus as in claim 1 further comprising an encryptor, wherein said code, after being processed by said proscribed code scanner, may be reencrypted by said encryptor.

3. An apparatus as in claim 2, further comprising an SSL decryptor.

4. An apparatus as in claim 2, further comprising an S/MIME decryptor.

5. A method for processing altered code comprising:
   intercepting said code; decrypting said code; scanning said code with a proscribed code scanner for the presence of proscribed code; and, providing an indicator for the presence of said proscribed code, said proscribed code scanner analyzing code for parameters of the code passing through the communications channel.

6. A method as in claim 5 further comprising the step of: reencrypting said code if said indicator is negative.

7. A method as in claim 5 further comprising the step of: further indicating the presence of said proscribed code if said indicator is positive.

8. A method as in claim 5 wherein the step of decrypting said code is preceded by the step of intercepting said code prior to decrypting said code.

9. A method for processing secure code transmitted through a communications channel comprising: intercepting said code; decrypting said code; scanning said code with a proscribed code scanner for the presence of proscribed code; and, providing an indicator for the presence of said proscribed code, said proscribed code scanner analyzing code for parameters of the code passing through the communications channel.

10. A method as in claim 9 wherein said code is secured through SSL encryption.

11. A method as in claim 9 wherein said code is secured through S/MIME encryption.

12. A method as in claim 9 further comprising the step of: reencrypting said code if said indicator is negative.

13. A method as in claim 9 further comprising the step of: further indicating the presence of said proscribed code if said indicator is positive.

14. A method as in claim 9 further comprising the step of providing a separate system inserted in said communications channel, and with at least one of said steps of intercepting said code; decrypting said code; scanning said code for the presence of proscribed code, and providing an indicator for the presence of said proscribed code, occurring on said separate machine.

15. A method as in claim 9, including intercepting a request from an original client or an original server on said communications channel, creating a new secure server that communicates with said original client, creating a new secure client that communicates with said original server, intercepting with said secure client and said secure server communications occurring between said original client and said original server.

16. An apparatus for processing secure code transmitted through a communications channel between a client and a server comprising: a protocol parser; a decryption component; and, a proscribed code scanner; wherein said protocol parser intercepts secure code being transmitted through said communications channel and transfers said code to said decryption component for decryption and scanning by said proscribed code scanner, said proscribed code scanner analyzing code for parameters of the code passing through the communications channel; wherein the protocol parser is configured for activation upon the opening of a communication channel by a request of said original client or a request of said original server, and for creating a new secure server that communicates with said original client, and a new secure client that communicates with said original server, wherein the secure client and secure server intercept communications occurring between said original client and said original server.

* * * * *